Patented Sept. 19, 1939

2,173,384

UNITED STATES PATENT OFFICE 2,173,384

COPPER XANTHATE

Roscoe H. Carter, Washington, D. C., dedicated to the free use of the People of the United States of America No Drawing. Application August 16, 1937, Serial No. 159,326

3 Claims. (Cl. 260—438)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to me of any royalty thereon.

I hereby dedicate the invention herein described to the free use of the People of the United States of America to take effect on the granting of a patent to me.

The object of my invention is to provide new and useful copper xanthates of the lower mono alkyl ethers of di-ethylene glycol.

They may be prepared according to the reaction $$ROCH_2CH_2OCH_2CH_2OH + CS_2 + KOH \rightarrow$$
$$ROCH_2CH_2OCH_2CH_2OCS_2K + H_2O$$

wherein R represents an organic radicle such as methyl, ethyl, propyl, butyl, amyl and others of the alcohol series having the formula $C_nH_{2n+2}O$.

The acohols used for the preparation of the ethers of diethylene glycol may be normal or branched chain compounds. Strong alkalies other than potassium hydroxide may also be used in this reaction.

The following examples illustrate the preparation of typical members of the xanthate series described herein.

1. Xanthates of the mono ethyl ether of diethylene glycol.

Twenty-five grams of mono ethyl ether of diethylene glycol, 10 grams of potassium hydroxide and 14 grams of carbon disulfide were mixed together and allowed to stand 48 hours. A reaction took place with the formation of the potassium xanthate. This compound was dissolved in water and added to a solution of 20 grams of $CuSO_4.5H_2O$ in 1½ L. of water. A reddish brown precipitate formed which changed to yellow on standing. This was filtered off, washed twice with water and twice with acetone and dried in air. By analysis is was found to have a copper content agreeing closely with the theoretical copper content of the copper xanthate of the mono ethyl ether of di-ethylene glycol. The acetone filtrate was evaporated leaving as a residue the di-xanthogen of the mono ethyl ether of di-ethylene glycol. This was an oily liquid.

2. Xanthates of the mono butyl ether of diethylene glycol.

Twenty-five grams of the mono butyl ether of di-ethylene glycol, 10 grams of potassium hydroxide and 13 grams of carbon disulfide were mixed together and allowed to stand 48 hours. A reaction took place with the formation of the potassium xanthate. This compound was dissolved in water and added to a solution of 20 grams of $CuSO_4.5H_2O$ in 1½ L. of water. A reddish brown precipitate formed which changed to yellow on standing. This was filtered off, washed twice with water and twice with acetone and dried in air. By analysis it was found to have a copper content agreeing closely with the theoretical copper content of the copper xanthate of the mono butyl ether of di-ethylene glycol. The acetone filtrate was evaporated leaving as a residue the di-xanthogen of the mono butyl ether of di-ethylene glycol. This was an oily liquid.

It is evident from these reactions that alkali metal xanthates can be formed from the lower mono-alkyl ethers of di-ethylene glycol when molecularly equivalent amounts of an alkali metal hydroxide, carbon disulfide and the mono alkyl ether are allowed to react together. These compounds in the case of the potassium salts are soluble in water and possess characteristics similar to the xanthates of the alcohols. They combine with copper in the characteristic reaction of xanthates according to the equation $$4ROCH_2CH_2OCH_2CH_2OCS_2K + 2CuSO_4 \rightarrow 2K_2SO_4 + 2ROCH_2CH_2OCH_2CH_2OCS_2Cu + (ROCH_2CH_2OCH_2CH_2OCS_2)_2$$

The copper salts are characteristic yellow finely divided powders, insoluble in water. The di-xanthogens are oily viscous liquids insoluble in water but soluble in organic solvents. These compounds may find a number of useful applications especially as insecticides and fungicides. It is recognized that the xanthates of some of the alcohols possess insecticidal value but most of them have disagreeable and unpleasant odors. I have found that the xanthates of the lower mono alkyl ethers of di-ethylene glycol for the most part do not have these disagreeable and unpleasant odors and therefore represent a distinct improvement over the former class of compounds.

In addition they retain to a certain extent their ethereal properties which should increase their effectiveness.

Having thus described my invention, what I claim for Letters Patent is:

I claim:

1. A cuprous xanthate of a lower mono alkyl ether of diethylene glycol.

2. The copper xanthate of the mono ethyl ether of di-ethylene glycol.

3. The copper xanthate of the mono butyl ether of di-ethylene glycol.

ROSCOE H. CARTER.